United States Patent [19]

Trier

[11] Patent Number: 5,078,769
[45] Date of Patent: Jan. 7, 1992

[54] METHOD AND APPARATUS FOR PRESSING HOLLOW BLANKS FROM GLASS

[75] Inventor: Wolfgang Trier, Oberursel, Fed. Rep. of Germany

[73] Assignee: International Partners in Glass Research, Windsor, Conn.

[21] Appl. No.: 541,786

[22] Filed: Jun. 20, 1990

[30] Foreign Application Priority Data

Jun. 26, 1989 [DE] Fed. Rep. of Germany ....... 3920868

[51] Int. Cl.$^5$ .............................................. C03B 11/16
[52] U.S. Cl. ......................................... 65/25.1; 65/81; 65/103; 65/137; 65/169; 65/362; 65/319
[58] Field of Search ................. 65/81, 25.1, 137, 169, 65/267, 300, 362, 319, 103

[56] References Cited

U.S. PATENT DOCUMENTS 3,254,981  6/1966  Havens .............................. 65/356 X
4,623,374  11/1986  Doud et al. ....................... 65/362 X
4,682,996  7/1987  Foster et al. ..................... 65/76 X Primary Examiner—Robert L. Lindsay
Attorney, Agent, or Firm—Burns, Doane, Swecker & Mathis

[57] ABSTRACT

Hollow blanks of glass are pressed between a hollow mold and a plunger (10). The mold comprises an inner wall complementary to the outer side of a blank. The plunger (10) comprises an open-pore plunger head (11) having a surface (24) complementary to the inner side of the blank and an inner cavity (15) which is filled with a liquid. In each working cycle a partial amount of the liquid evaporates by heat transfer from the glass to the plunger head (11) at the surface (24) of the latter, a separation vapor layer forming between the surface of the plunger head and the glass. The liquid pressure in the cavity (15) of the plunger head (11) is adapted to the pressing pressure obtaining in the glass during the pressing in each case until the glass has reached its dimensional stability necessary for withdrawal of the plunger head (11).

20 Claims, 2 Drawing Sheets

METHOD AND APPARATUS FOR PRESSING HOLLOW BLANKS FROM GLASS

BACKGROUND OF THE INVENTION

The invention relates to a method for pressing hollow blanks from glass between a mold having an inner wall complementary to the outer side of a blank and a plunger comprising an open-pore plunger head having a surface complementary to the inner side of the blank and an inner cavity which is filled with liquid of which in each working cycle a partial amount evaporates by heat transfer from the glass to the plunger head at the surface of the latter, forms between said surface and the glass a separating vapour layer and is replaced by further liquid introduced into the plunger head.

For making lightweight glass containers the press-and-blow method has established itself. In this method, a parison, in contrast to the glass blowing method, is not made by blowing but by pressing. The pressed parison is subsequently blown up in a blowing mold.

With this method, wide mouth glasses such as jam glasses have been made for decades. By improving the technology it is possible with this method to make narrow-neck containers such as bottles which are distinguished by a particularly uniform wall thickness distribution and low weight. Difficulties are encountered in the pressing of the parison when the operation must be carried out with a slim plunger (press ram) hardly greater than finger thick having a flank angle of for example only 2° to 3°.

Hitherto, when using solid plungers it was only by particularly accurate control of the working times and operating temperatures thereof that shrinkage of the glass onto the plunger on cooling thereof could be avoided. Another disadvantage when using solid plungers is that due to high shearing stresses in the glass during the pressing operation and due to sliding processes between the glass and the surface of the plunger it is not possible to prevent completely damage to the glass surface and metal abrasion of the plunger. Damage to the glass surface and small metal particles embedding themselves in the glass reduce the utility strength of the glass container, in particular its impact strength.

To avoid these disadvantages, U.S. Pat. No. 4,682,996 ("Foster") has suggested a method of the type described at the beginning and an apparatus for carrying out said method. The thin vapour layer forming between the glass and the surface of the plunger is intended to act as a lubricating film facilitating sliding between the glass and the plunger and thus avoiding metal abrasion from the plunger and reducing the heat transfer between the glass and the plunger. However, hitherto it was not possible to achieve this objective with adequate certainty in particular with slim plungers as are necessary for making narrow neck containers.

SUMMARY OF THE INVENTION

The invention is therefore based on the problem of further developing a method of the type described at the beginning and an apparatus suitable for carrying out said method in such a manner that contact between the glass and the surface of the plunger is avoided and a subsequent shrinking of the parison onto the plunger is avoided with still greater certainty, even when the plunger is particularly slim and has a flank angle of the order of magnitude of only 1°.

This problem, in so far as the method is concerned, is solved according to the invention in that the liquid pressure in the cavity of the plunger head is adapted to the pressing pressure obtaining in the glass during the pressing in each case until the glass has reached its dimensional stability necessary for withdrawal of the plunger head.

The invention is based on the recognition that it is not enough to keep the pressure in the cavity of the plunger head constant by connecting it, for example to a water pipe. Admittedly, a constant pressure in the plunger head can always be dimensioned so that enough liquid emerges through the pores to form a vapour layer between the glass and the surface of the plunger head. However, it is not possible in all cases with a constant pressure on the one hand to avoid excess liquid consumption by liquid dripping off the plunger and on the other to exclude the possibility of liquid being forced by the pressing pressure out of the pores of the plunger head into the cavity thereof and thereby preventing formation of a closed vapour layer on the entire surface of the plunger head or locally again destroying such a vapour layer during the pressing.

These difficulties are avoided by the adaptation according to the invention of the liquid pressure to the pressing pressure. A substantially uniform vapour layer is formed which separates the parison being formed from the plunger head, the heat transfer between glass and plunger head thereby being reduced and the shear stress in the glass diminished, abrasion of the plunger head prevented and shrinkage of the parison or blank onto the plunger head excluded.

Preferably, the liquid pressure in the cavity of the plunger head is increased during the pressing to an amount constituting 90% to 110% of the greatest pressing pressure in the glass. This compensates hydrodynamic pressure losses in the pores of the plunger head in a manner such that the desired equilibrium is achieved between the liquid pressure and the pressing pressure at or in the vicinity of the surface of the plunger head.

In an expedient implementation of the method according to the invention the liquid pressure in the cavity of the plunger head is increased during a first time interval which starts shortly before immersion of the plunger head into the mold and ends shortly after the beginning of the pressing. By expedient limitation of this time interval the liquid consumption can be minimized. The end of the time interval can be set in such a manner than on conclusion of the pressing operation, when the plunger head is moved out of the mold, there is still enough vapour pressure available to prevent ambient air which may be contaminated from being sucked into the freshly pressed parison. It is additionally assured in this manner that the parison is kept free from contamination.

It is further advantageous for the liquid pressure in the cavity of the plunger head to be increased again during a second time interval which follows the withdrawal of the plunger head from the mold. In this manner, the liquid can be employed to detach glass particles or foreign bodies which might have attached themselves to the surface of the plunger head. Parts of the liquid evaporate in the pores of the plunger head, still hot after a pressing operation, and knock off liquid droplets adhering further to the outside, the surface of the plunger head thereby being thoroughly cleaned. The liquid amount which during the second time interval passes through the pores of the plunger head to the surface thereof can be metered so that the plunger head is adequately cooled, thereby making further cooling of the plunger head unnecessary or at least a reduction of such cooling possible.

Preferably, the liquid pressure is increased in each case by introducing additional liquid into the cavity of the plunger head. It is however alternatively possible to effect temporary pressure increases in the cavity by temporarily reducing the volume of said cavity, for example by a piston penetrating periodically into said cavity. The liquid amount consumed must then be replenished in phases in which the piston or the like returns to a rest position As known from U.S. Pat. No. 4,682,996, an apparatus suitable for carrying out the method according to the invention comprises a plunger having an open-pore hollow plunger head and a conduit for introducing liquid into the plunger head. According to the invention this apparatus is further developed in that the conduit contains a shutoff member which is periodically actuable adapted to the movements of the plunger.

The shutoff member may, for example be a check valve which automatically separates the cavity from a liquid source, for example an ordinary water pipe, whenever the pressing pressure due to the porosity of the plunger head generates a pressure in the interior thereof which is higher than the pressure of the liquid source. It is however also possible to provide as periodically actuable shutoff member a piston which is controlled by a separate energy source and serves at the same time the purpose of reducing the volume of the cavity of the plunger head periodically in order in this manner to adapt the liquid pressure in the cavity to the pressing pressure obtaining in the glass during pressing.

In every case it is expedient for the shutoff member to be fixedly connected to the plunger and reciprocatable with the latter. In this manner a flexible connecting conduit between shutoff member and plunger is avoided, the elasticity of which might impair the desired pressure buildup in the cavity of the plunger.

It is further advantageous for the shutoff member to be connected to a hollow insert body which extends into the cavity of the plunger head, has at least one exit opening and between itself and the inner wall of the plunger head leaves free an annular space filled through the exit opening(s) with the liquid. Preferably, the width of the annular space measured in the radial direction is less than the wall thickness of the plunger head.

The insert body controls the flow and distribution of the liquid along the inner surface of the hollow plunger head. Depending on the configuration of the plunger head and its position in space, pointing upwardly or downwardly, the insert body is provided with one or more exit openings of which the arrangement is chosen such that the surface of the plunger head on immersion into the mold always has a uniform liquid film.

The shutoff member may be a check valve. In this case the pressure buildup in the cavity of the plunger head is defined directly by the pressing pressure.

BRIEF DESCRIPTION OF THE DRAWINGS

An example of embodiment of the invention will be explained hereinafter with further details with the aid of schematic drawings, wherein.

DETAILED DESCRIPTION OF THE PREFERRED EMBODIMENTS

Figure 1:
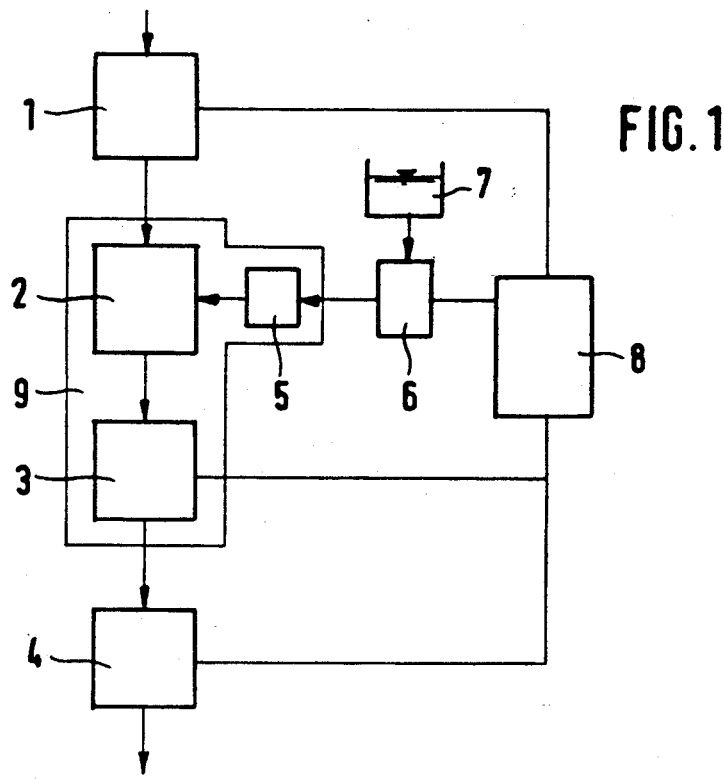
FIG. 1 is a circuit scheme of a plant for making hollow blanks or parisons from glass employing an apparatus according to the invention.
Figure 3:
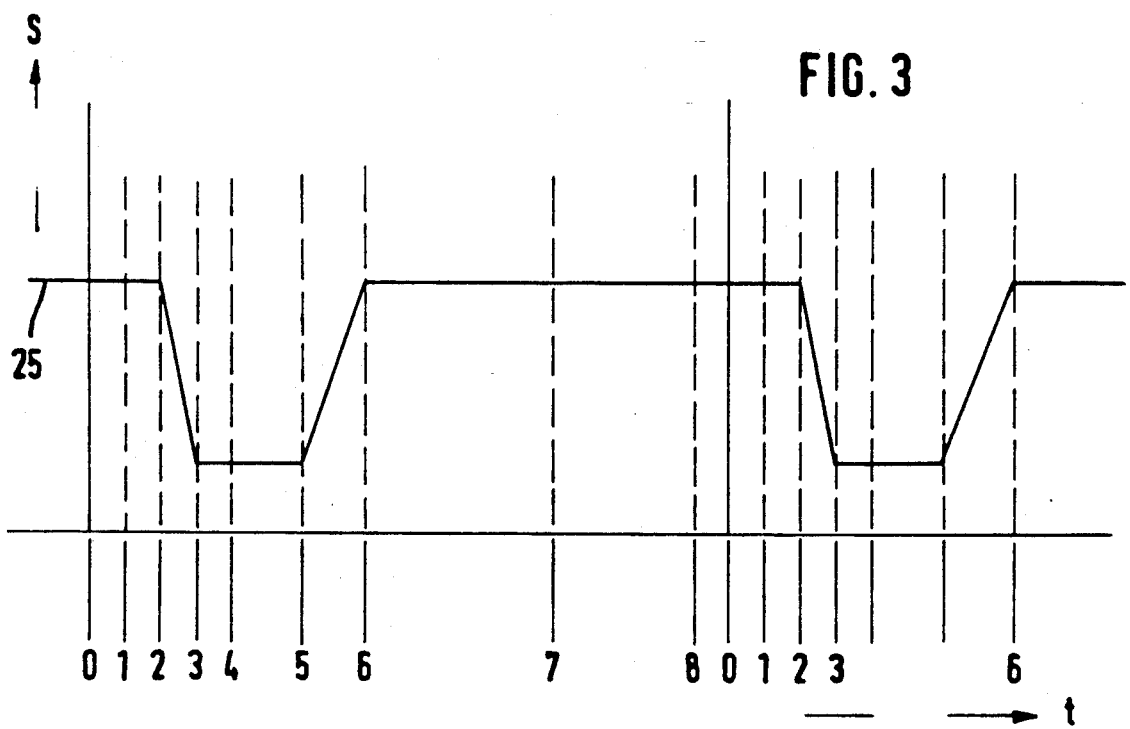
FIG. 3 is a diagram of the time profile of the plunger movements and other processes in the pressing.

The plant illustrated in FIG. 1 includes a feeder 1 which in each working cycle passes a gob of molten glass to a performing station with a pressing unit 2. Parisons or blanks are pressed in the pressing unit 2. The performing station is followed by a blowing finishing station 3 in which the parisons are given their final form by blowing. From there, the parisons go to a conveyor 4 which carries them away.

Via a cooler with temperature regulator 5, a liquid suitable for cooling and forming a separating vapour layer, for example water at a temperature of 10° to 20° C., is supplied to the press unit 2, being conveyed by a metering pump 6 from a container 7. All the functions of the plant are monitored and controlled by a control unit 8.

Figure 2:
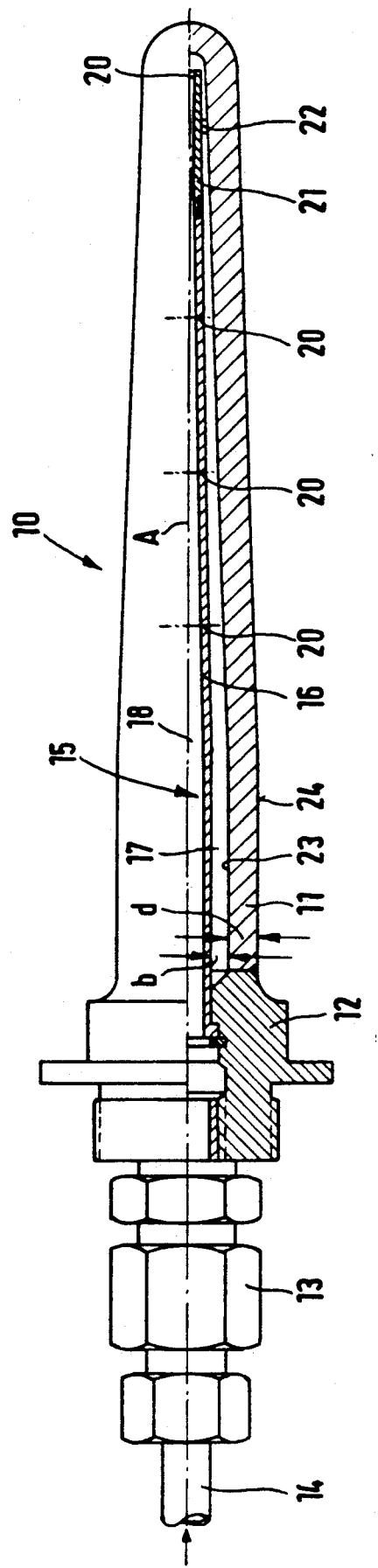
FIG. 2 shows a plunger of an apparatus according to the invention which is partially sectioned in an axial plane.

The pressing apparatus 2 includes, after "2" (second occurrence) insert according to FIG. 2 a plunger 10 having a plunger head 11 of open-pore material, for example sintered metal having a porosity between 10% and 30%, preferably 25%, with respect to the volume of the plunger head. The plunger head 11 is secured to a support body 12. A shutoff member 13 is screwed into the support body 12 and in the example of the embodiment illustrated is constituted by a usual commercial check value and is connected by a conduit 14 via the cooler with temperature regulator 5 and the metering pump 6 to the container 7.

The plunger head 11 comprises a cavity 15 which contains a tubular insert body 16. The insert body 16 consists, for example, of stainless steel and is secured to the support body 12 in such a manner that it extends coaxially with the plunger head 11; both therefore have a common geometrical longitudinal axis A. In this manner the cavity 15 of the plunger head 11 is divided into an annular space 17 between the inner wall of the plunger head 11 and the insert body 16 and an inner space 18 within said insert body 16.

The inner space 18 is connected via the shutoff member 13 to the conduit 14 and is connected by at least one exit opening 20 of relatively small diameter to the annular space 17. The number and arrangement of the exit openings 20 depend on the length of the plunger head 11 and its position in space. If, for example, the plunger head 11 assumes a vertically upwardly directed working position, it is expedient for the insert body 16 to have an exit opening 20 only at its free upper end. The liquid introduced through the conduit 14 via the shutoff member 13 into the inner space 18 is then sprayed by said exit opening 20 in the form of a sharp jet vertically upwardly against the inner wall of the plunger head 11 and distributes itself there in the annular space 17. To enable the cross-section of said jet to be varied if required, in the example of the embodiment illustrated in FIG. 2, an interchangeable nozzle 21 is screwed into the end of the insert body 16. The nozzle 21 comprises a plurality of radial studs 22 which are distributed over its outer surface and ensure that a predetermined distance from the inner wall of the plunger head 11 is maintained.

The inner wall 23 of the plunger head 11 is cylindrical in the vicinity of the support body 12 and with increasing distance from the latter becomes slimmer so that it gradually converges towards the insert body 16 without ever directly contacting the latter. The outer surface 24 of the plunger head 11 is geometrically similar to the inner wall 23. The width b of the annular space 17 measured in, radial direction is everywhere considerably smaller than the wall thickness d of the plunger head 11.

Diagram 3 contains a stepped line 25 representing the travel s of the plunger 10 over the time t. As vertical lines, specific instants $t_0$ to $t_8$ are entered in the diagram and at these instants the following events take place:

$t_0$ Drop fall; a gob of glass passes into a mold, which is not illustrated.

$t_1$ The metering pump 6 starts to convey a predetermined amount of water through the shutoff member 13 into the interior 18 of the insert body 16.

$t_2$ The plunger head 11 dips into the glass.

$t_3$ The plunger head 11 comes to a stop; the contact of the surface 24 thereof with the glass has reached its maximum.

$t_4$ The metering pump 6 is switched off.

$t_5$ The plunger 10 is withdrawn.

$t_6$ The plunger head 11 is moved completely out of the parison or blank formed.

$t_7$ The metering pump 6 is again switched on.

$t_8$ The metering pump 6 is switched off.

$t_0$ A new working cycle begins.

The entire amount of water per working cycle supplied to the plunger head 11 in the manner described has for example the order of magnitude of 6 $cm^3$ to 12 $cm^3$ when the plunger head is one with which parisons are pressed for making beer bottles of 0.33 1 volume. The temperature of the water supplied is preferably 15° C.

While the invention has been described with reference to the foregoing embodiments, changes and modifications may be made thereto which fall within he scope of the appended claims.

I claim:

1. A method for making hollow glass blanks, comprising the steps of:
   pressing molten glass between a mold having an inner wall complementary to an outer side of a blank and a plunger, the plunger comprising an open-pore plunger head having a plunger surface complementary to an inner side of the blank and an inner cavity which is filled with liquid, a partial amount of the liquid being evaporated during each working cycle by heat transfer from the glass to the plunger head at the plunger surface, the evaporated liquid forming a separating vapour layer between the plunger surface and the glass and the vapour layer being replaced by further liquid introduced into the plunger head; and
   adjusting liquid pressure in the cavity of the plunger head as a function of pressing pressure in the glass during the pressing step until the glass has reached its dimensional stability necessary for withdrawal of the plunger head.

2. The method according to claim 1, wherein the liquid pressure in the cavity of the plunger head is increased during the adjusting step to an amount constituting 90% to 110% of a maximum pressing pressure int eh glass.

3. The method according to claim 1 or 2, wherein the adjusting step includes increasing the liquid pressure in the cavity of the plunger head during a first time interval which starts shortly before immersion of the plunger head into the mold and ends shortly after the beginning of the pressing step.

4. The method according to claim 3, wherein the adjusting step includes increasing the liquid pressure in the cavity of the plunger head again during a second time interval following withdrawal of the plunger head from the mold.

5. The method according to claim 1 or 2, wherein the liquid pressure is increased during the adjusting sep by introducing additional liquid into the cavity of the plunger head.

6. An apparatus for making hollow glass blanks, comprising:
   a plunger having an open-pore hollow plunger head, a conduit for introducing liquid into the plunger head and, characterized in that the conduit a shutoff member in fluid communication with the conduit, the shutoff member periodically preventing return of liquid from the plunger head to the conduit as a function of.

7. The apparatus according to claim 6, wherein the shutoff member is fixedly connected tot eh plunger and is reciprocatable therewith.

8. The apparatus according to claim 7, wherein the plunger head includes a cavity in fluid communication with the conduit, a hollow insert body being in fluid communication with the shutoff member and extending into the cavity of the plunger head, the insert having at least one exit opening therethrough and an annular space being provided between the insert and an inner wall of the lunger head, the exit opening supplying liquid to the annular space.

9. The apparatus according to claim 8, wherein the annular space has a width in a radial direction which is less than a wall thickness between the inner wall and an outer surface of the plunger head.

10. The apparatus according to claim 6, wherein the shutoff member comprises a check valve.

11. The method according to claim 3, wherein the liquid pressure is increased during the adjusting step by introducing additional liquid into the cavity of the plunger head.

12. The apparatus according to claim 7, wherein eh shutoff member comprises a check valve.

13. The apparatus according to claim 8, wherein the shutoff member comprises a check valve.

14. The apparatus according to claim 9, wherein the shutoff member comprises a check valve.

15. The method according o claim 1, wherein eh adjusting step is performed by a shutoff member, the shutoff member being periodically actuated to prevent return of liquid from the cavity of the plunger to a conduit supplying the cavity with liquid.

16. The method according to claim 1, wherein the pressing step provides a narrow-neck hollow glass blank, the plunger having a flank angle of no greater than 3°.

17. The method according to claim 3, wherein he liquid pressure is increased by spraying liquid against an inner wall of the plunger head.

18. The method according to claim 1, wherein eh adjusting a step is performed by periodically moving a piston into the cavity of the plunger.

19. The apparatus according o claim 6, wherein eh shutoff member comprises a check valve which separates the cavity of the plunger form a source of liquid when pressure of liquid in the cavity exceeds pressure of the liquid source.

20. The apparatus according to claim 6, wherein the plunger has a flank angle of no greater than 3°.

* * * * *